Patented Sept. 18, 1951

2,567,978

UNITED STATES PATENT OFFICE 2,567,978

METHOD OF PREPARING PLASTIC MOLDING COMPOSITIONS

Philander B. Taylor, Larchmont, N. Y., assignor to Cosmos Dental Products, Inc., New York, N. Y., a corporation of New York No Drawing. Application August 5, 1947, Serial No. 766,478

1 Claim. (Cl. 260—34.2)

The present invention relates to plastic molding compositions of the ethylene derivative types, and more particularly to such compositions which may be plasticized to form elastic substances suitable for the production of elastic molds and molded elastic bodies.

According to current practice and technique, elastic molds and molded elastic bodies can be formed from resins of the ethylene derivative types only either by first molding the plasticized resin into desired shape with the application of heat and/or pressure, or by mixing the unplasticized or partially plasticized resin with a plasticizer whereupon the resin will eventually reach an elastomeric condition — which latter procedure may be accelerated by the application of heat. Where the molds or molded articles can not withstand the application of elevated temperature or high pressure, the molding compositions require a considerable time to reach the elastomeric condition.

The primary object of the present invention is to provide a method and means of reducing the time required for an unplasticized or partially plasticized resin molding composition of the ethylene derivative type to reach an elastomeric condition without the application of heat or pressure. A further object is to provide a method of and means for controlling the time within which a resin of the type set forth may be brought to an elastomeric condition and for controlling the elasticity or plasticity of a plasticized resin to best suit the particular application of the plasticized resin.

The foregoing and other objects of my invention not specifically enumerated I accomplish by adding to the plasticizer one or more modifying agents which function to promote and accelerate the incorporation of the plasticizer into a mass of unplasticized or partially plasticized resin and thereby reduce the time required for the resin to reach the elastomeric condition.

I have found that in order for this accelerated action to take place it is necessary for the modifying agent or agents which are to be added to the plasticizer to possess certain characteristics, viz.: (1) they must be compatible with the plasticizer, i. e., they must be miscible with the plasticizer in the proportions which are desired to be employed; (2) they must have a substantially higher vapor pressure than the plasticizer; and (3) they must have a softening, swelling or dissolving action on the unplasticized or partially plasticized resin. I have further discovered that the reduction in the time required for the plasticizer to cause the resin to reach an elastomeric condition by the addition of the modifying agent or agents to the plasticizer is a function of the rate and degree to which the resin is softened, swelled or dissolved by the modifying agent or agents.

After considerable research with various plasticizers and various modifying agents as to their effect upon certain ethylene derivative types of resins, I have collected considerable data at an ambient temperature of approximately 70° F. and give below a tabulation of the times required for a copolymer consisting of 90% vinyl chloride and 10% vinyl acetate in a finely powdered state to reach an elastomeric condition using different plasticizers to which various percentages of the organic liquid modifying agents have been added. In carrying out these tests, the ratio of the powdered resin to the liquid employed (plasticizer with added modifying agent) for mixing therewith is represented by P/L.

TABLE I

*Plasticizer—dibutyl phthalate*

$$\frac{P}{L} = \frac{5\frac{1}{2} \text{ grams}}{10 \text{ cc.}}$$

Time required for reaching elastomeric condition with:

| Modifying Agent | 40% agent in liquid | 20% agent in liquid | 10% agent in liquid | 5% agent in liquid |
|---|---|---|---|---|
| Acetone | 15″ | 1′ 15″ | 13′ 30″ | 37′ 30″. |
| Chloroform | 2′ 15″ | 27′ 30″ | 1 hr. 36′ | 3 hrs. 51′ 30″. |
| Methyl Ethyl Ketone | 15″ | 1′ 45″ | 10′ 30″ | 35′ 30″. |
| Ethyl Acetate | 30″ | 6′ 30″ | 17′ 30″ | 1 hr. 47′ 15″ |
| Methyl Isobutyl Ketone | 30″ | 7′ 15″ | 30′ | 40′ 30″. |
| Benzene | 9′ 30″ | 22′ | 45′ | 2 hrs. 30′. |
| Ether | 5′ | 11′ 15″ | 34′ | 1 hr. 43′ 15″. |
| Carbon Tetrachloride | 1 hr. 15′ 30″ | 2 hrs. | 3 hrs. 56′ 30″ | 6 hrs. 3′. |
| Diethyl Carbonate | 3′ 30″ | 21′ | 42′ | 2 hrs. 47′. |

TABLE II

*Plasticizer—tricresol phosphate*

$$\frac{P}{L}=\frac{5\frac{1}{2} \text{ grams}}{11 \text{ cc.}}$$

Time required for reaching elastomeric condition with:

| Modifying Agent | 40% agent in liquid | 20% agent in liquid | 10% agent in liquid | 5% agent in liquid |
|---|---|---|---|---|
| Acetone | 30″ | 4′ 15″ | 2 hrs. 4′ 30″ | |
| Methyl Ethyl Ketone | 30″ | 21′ 15″ | | |
| Methyl Isobutyl Ketone | 8′ 45″ | 2 hrs. 29′ | | |
| Ethyl Acetate | 1′ | 13′ | | |
| Diethyl Carbonate | 25′ 15″ | | | |
| Ether | 22′ 15″ | | | |

TABLE III

*Plasticizer—ethylhexyl phthalate*

$$\frac{P}{L}=\frac{5\frac{1}{2} \text{ grams}}{10 \text{ cc.}}$$

Time required for reaching elastomeric condition with

| Modifying Agent | 40% agent in liquid | 20% agent in liquid | 10% agent in liquid | 5% agent in liquid |
|---|---|---|---|---|
| Acetone | 15″ | 3′ 15″ | 44′ | 3 hrs. 5′ 30″ |
| Ether | | 2 hrs. 6′ 45″ | | |
| Diethyl Carbonate | 3′ | 1 hr. 41′ 30″ | | |

TABLE IV

*Flexol 3 G. H.—triethylene glycol di-2-ethyl butyrate*

$$\frac{P}{L}=\frac{5\frac{1}{2} \text{ grams}}{12 \text{ cc.}}$$

Time required for reaching elastomeric condition with

| Modifying Agent | 40% agent in liquid | 20% agent in liquid | 10% agent in liquid | 5% agent in liquid |
|---|---|---|---|---|
| Acetone | 4′ 30″ | 6′ 30″ | 27′ 15″ | |
| Ethyl Acetate | 5′ | | | |

In the preceding tables it will be noted that the time required for the powdered 90% vinyl chloride–10% vinyl acetate resin to reach an elastomeric condition solely with the indicated plasticizer but without any addition of a modifying agent has not been indicated. It may be stated, however, that with dibutyl phthalate approximately 12 hours is required, and in excess of said time is required when the plasticizers only of Tables II, III and IV are employed.

At times it may be desirable to add suitable fillers to prevent the early gumming of the particles by the more active modifying agents. Such fillers are also desirable when a more viscous mass is employed, to assure a smooth, homogeneous mix.

At times it may be desirable to slow up the rate of setting, which may be done by decreasing the powder/liquid ratio, or in the alternative a slower acting modifying agent may be used to replace or to supplement a more active modifying agent since the acceleration of the plasticizing action is dependent upon the rate at which the modifying agent acts on the resin.

It will thus be appreciated that by the selection of plasticizers and modifying agents to give setting times as desired, and/or by varying the powder/liquid ratio, plastic compositions ranging from a viscous fluid mass to a putty-like consistency may be readily predetermined to best suit any particular application to be made of the plasticized resin.

When a plastic molding composition is desired for use as a dental impression material capable of making an impression of the oral tissues, it will be appreciated that the time for the plastic molding composition to reach an elastomeric condition should be relatively short, i. e., about five minutes or less. For producing such impression material I have discovered that a smooth mix of the resin and liquid may be more readily attained and that the amount of modifying agent necessary may be materially reduced, if an amount of a soluble resin is dissolved in the liquid prior to adding thereto the resin to be plasticized and molded. The selection of a particular resin to be first added to the liquid will depend upon the properties desired in the set mass. The amount of such added resin will depend upon the viscosity desired in the plastic molding composition.

The present invention is applicable to a variety of resins of the ethylene derivative types, i. e., resins having at least one ethylene linkage $>C=C<$ such as the vinyls, mixtures of vinyls with acrylates, methacrylates, styrenes, etc., and copolymers of said resins.

Although I have disclosed a large number of relationships of plasticizer—modifying agent treating liquids for use with a specific vinyl chloride—vinyl acetate copolymer, it will be understood that the disclosure herein is not intended to be limitative of the scope of the invention but merely illustrative of the nature of the effects which may be achieved with different plasticizers and various amounts of different modifying agents. Hence, changes in the specific examples given may be made within the scope of the appended claim without departing from the spirit of the invention.

What I claim is:

The method of accelerating the time required for transforming, at an ambient temperature of approximately 70° F. and at atmospheric pressure, a resinous copolymer in powdered form to an elastomeric condition, said method consisting in plasticizing a resinous copolymer consisting of approximately 90% vinyl chloride and 10% vinyl acetate with a plasticizing liquid containing a plasticizer for the resinous copolymer dissolved in an organic liquid modifying agent which is compatible with the plasticizer, has a substantially higher vapor pressure than the plasticizer and is capable of softening, swelling or dissolving the resinous copolymer, in the ratio of 5½ grams of copolymer to from 10 to 12 cc. of plasticizing liquid and increasing the proportion of the liquid modifying agent to the plasticizer in the plasticizing liquid as it is desired to accelerate the time for transforming the resinous copolymer to the elastomeric condition.

PHILANDER B. TAYLOR.

REFERENCES CITED

The following references are of record in the file of this patent:

UNITED STATES PATENTS

| Number | Name | Date |
|---|---|---|
| 2,120,931 | Cox et al. | June 14, 1938 |
| 2,354,744 | Dreyfus | Aug. 1, 1944 |
| 2,385,920 | Jenkins | Oct. 2, 1945 |
| 2,389,460 | Rinehart | Nov. 20, 1945 |